United States Patent
Han et al.

(10) Patent No.: US 7,251,102 B2
(45) Date of Patent: Jul. 31, 2007

(54) ABS THROUGH AGGRESSIVE STITCHING

(75) Inventors: Cherng-Chyi Han, San Jose, CA (US);
Mao-Min Chen, San Jose, CA (US);
Laurie Lauchlan, Saratoga, CA (US);
Lei Zhang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 420 days.

(21) Appl. No.: 10/782,496

(22) Filed: Feb. 19, 2004

(65) Prior Publication Data
US 2005/0186797 A1 Aug. 25, 2005

(51) Int. Cl.
*G11B 5/127* (2006.01)

(52) U.S. Cl. ................. 360/126; 29/603.15; 29/603.16

(58) Field of Classification Search ................ 360/126, 360/125; 29/603.07, 603.08, 603.12, 603.13, 29/603.14, 603.15, 603.16
See application file for complete search history.

(56) References Cited

U.S. PATENT DOCUMENTS

| | | | | |
|---|---|---|---|---|
| 5,640,753 | A * | 6/1997 | Schultz et al. | ........... 29/603.08 |
| 6,591,480 | B1 | 7/2003 | Chen et al. | ............... 29/603.14 |
| 6,600,629 | B2 * | 7/2003 | Kanada et al. | .............. 360/120 |
| 6,608,737 | B2 | 8/2003 | Han et al. | .................... 360/317 |
| 2004/0223258 | A1 * | 11/2004 | Giorgis et al. | .............. 360/126 |

\* cited by examiner

*Primary Examiner*—William J Klimowicz
(74) *Attorney, Agent, or Firm*—Saile Ackerman LLC; Stephen B. Ackerman

(57) ABSTRACT

Aggressive (i.e. tight tolerance) stitching offers several advantages for magnetic write heads but at the cost of some losses during pole trimming. This problem has been overcome by replacing the alumina filler layer, that is used to protect the stitched pole during trimming, with a layer of electro-plated material. Because of the superior step coverage associated with the plating method of deposition, pole trimming can then proceed without the introduction of stresses to the stitched pole while it is being trimmed.

11 Claims, 5 Drawing Sheets

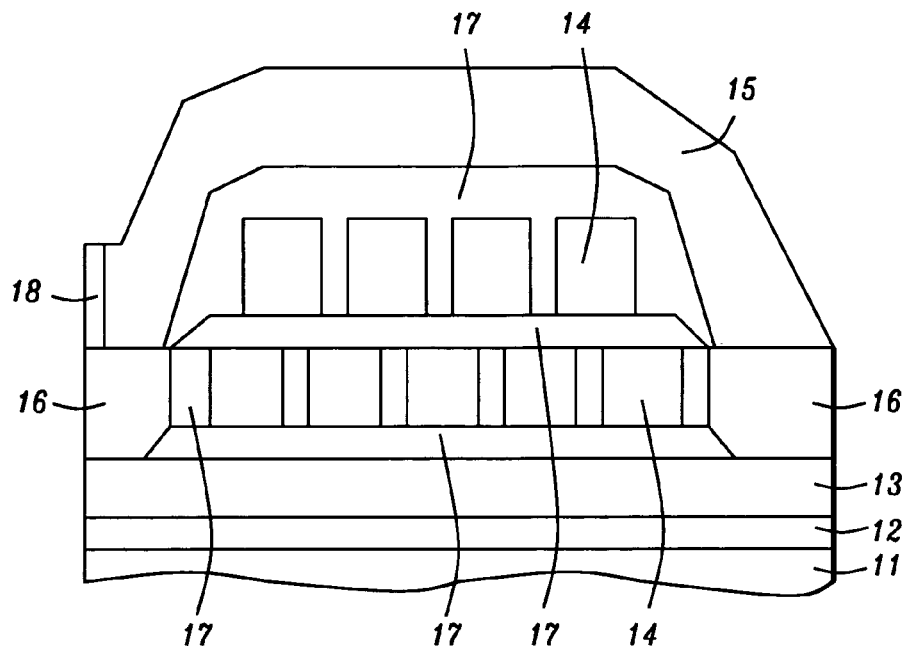
FIG. 1 – Prior Art
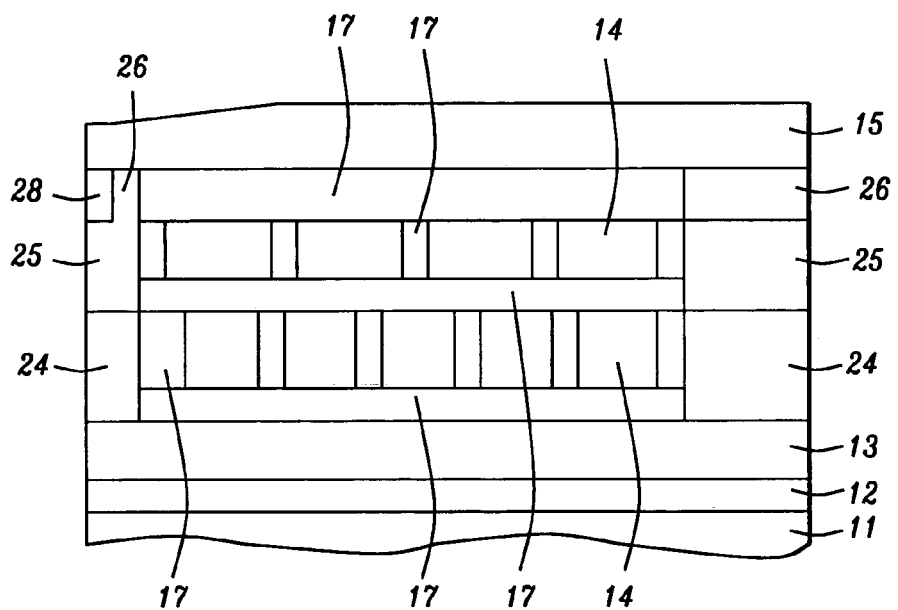
FIG. 2 – Prior Art

ABS THROUGH AGGRESSIVE STITCHING

FIELD OF THE INVENTION

The invention relates to the general field of magnetic write heads with particular reference to pole trimming.

BACKGROUND OF THE INVENTION

The stitched writer has been the major workhorse of the data recording industry for the past several years due to its capability to provide narrow track width as well as for its tolerance control. On the other hand, the planar writer has proven to have better mechanical behavior due to its planar and non-recessed structure. Both writer designs can, however, be further improved by adopting aggressive stitching techniques to overcome the following problems.

A. FIG. 1 illustrates a LDCR (low DC resistance) write head which is an example of a stitched writer design. Seen there are shielding layers 11 and 12 (11 being part of the reader head which is not shown), lower pole 13 (P1) and stitched pole 16 (P2). Also shown are coils 14, insulation 17, and upper pole 15 (P3). Not shown, but necessarily present, is a write gap between 15 and 16. The recession of P3, 15, relative to P2, 16, can impact over-writing, write saturation, and adjacent track erasure. With smaller track width, one can further enhance the writing capability and write saturation by reducing the recession and by ensuring balanced adjacent track erasure. However, the integrity of the alumina that is used to fill in the P3 recession area (element 18) turns out to be a problem due to poor step coverage by the alumina.

B. FIG. 2 illustrates an example of a planar writer. Seen there are shielding layers 11, 12, and 13 (11 being part of the reader head which is not shown). Lower pole P1 is made up of three parts, 24, 25, and 26 while P2 is upper pole 15. Also shown are coils 14 and insulation 17. As noted above, not shown, but necessarily present, is a write gap between 15 and 26. For this type of design, ATE (adjacent track erasure) is a serious problem. Either the P2 flank field or the P1 field induces the ATE problem. A reduction of the P2 flank field can be achieved by using a P2 step design, as show, but to further reduce the P1 field induced by the PPT (perpendicular pole trim) process, one needs to either recess a portion of P1 or further extend P1 to enhance the P1/P2 coupling. However, having a recessed P1 portion gives rise to the same alumina integrity problem discussed above, i.e. the poor alumina step coverage associated with element 28.

The present invention discloses how to overcome the alumina integrity problem at the ABS (air bearing surface). The invention makes possible both aggressive P3 stitching as well as aggressive P1 recession without any of the problems associated with the alumina integrity.

A routine search of the prior art was performed with the following references of interest being found:

In U.S. Pat. No. 6,608,737, a Headway patent, Han et al. show a plated P2 where Ps is stitched to P2. In U.S. Pat. No. 6,591,480, Chen et al. disclose forming both poles by plating where an upper pole yoke is plated over the upper pole piece.

SUMMARY OF THE INVENTION

It has been an object of at least one embodiment of the present invention to provide a process for pole trimming a stitched writer without causing any accessory damage thereto.

Another object of at least one embodiment of the present invention has been that said writer be a LDCR write head.

Still another object of at least one embodiment of the present invention has been that said writer be a planar writer.

A further object of at least one embodiment of the present invention has been to provide the structures that derive from said trimming processes.

These objects have been achieved by replacing the alumina filler layer, that is used to protect the stitched pole during trimming, with a layer of electro-plated material. Because of the superior edge coverage associated with the plating method of deposition, pole trimming can then proceed without the introduction of stresses to the stitched pole while it is being trimmed.

BRIEF DESCRIPTION OF THE DRAWINGS

FIG. 1 shows a LDCR write head of the prior art.
FIG. 2 shows a planar write head of the prior art.

DESCRIPTION OF THE PREFERRED EMBODIMENTS

We will disclose the present invention through a description of improved processes for the manufacture of both LDCR and planar writers. These descriptions will also make clear the structures that are claimed.

1$^{st}$ Embodiment (LDCR Writer)

Figure 3:
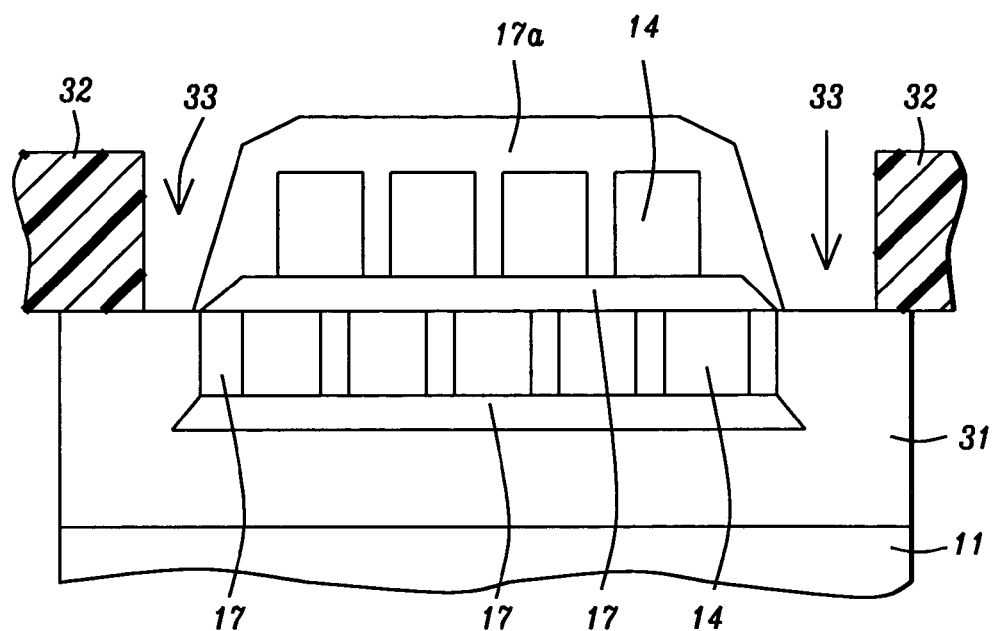
FIG. 3 illustrates the formation of the first of two photoresist molds for use in depositing the upper magnetic pole of a LDCR writer.

Referring now to FIG. 3, the process begins with the provision of lower magnetic pole 31 (for purposes of simplification, elements 12, 13 and 16 are shown as single element 31) in which we form a cavity which contains write coils 14. The latter are coated with layer of insulation 17a and extend above the cavity by between about 3 and 5 microns. A seed layer (not shown but needed to initiate the plating) coats 17a. As seen, the cavity that contains the coils is fully filled.

The structure is then coated with a layer of a positive photoresist which, by exposing through a first mask and then performing a first development, gets patterned into mold 32 which surrounds coils 14 but leaves areas 33 at the top surface of lower pole 31 exposed. These area are typically between about 2 and 4 microns wide.

Figure 4:
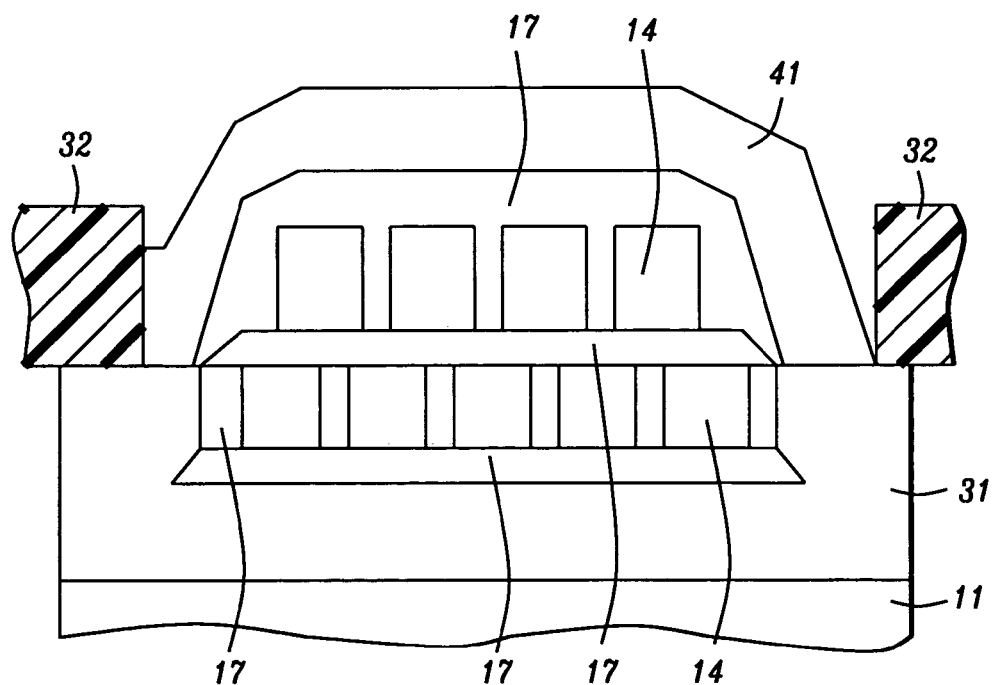
FIG. 4 shows the upper pole in place.
Figure 5:
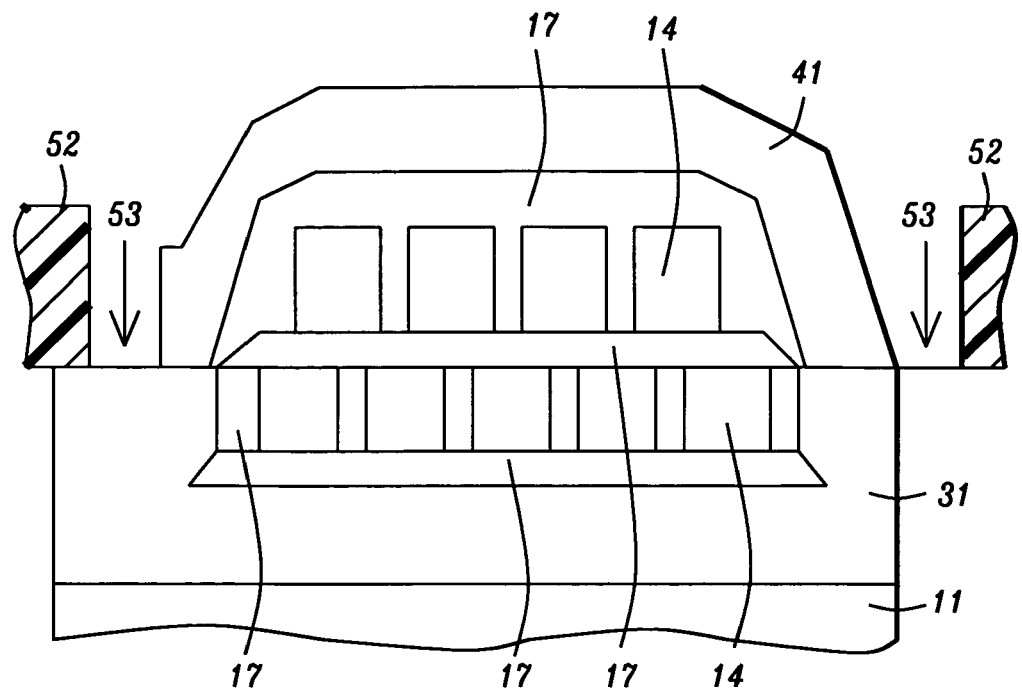
FIG. 5 shows how the mold shown in FIG. 3 may be enlarged through a second exposure through a new mask.
Figure 6:
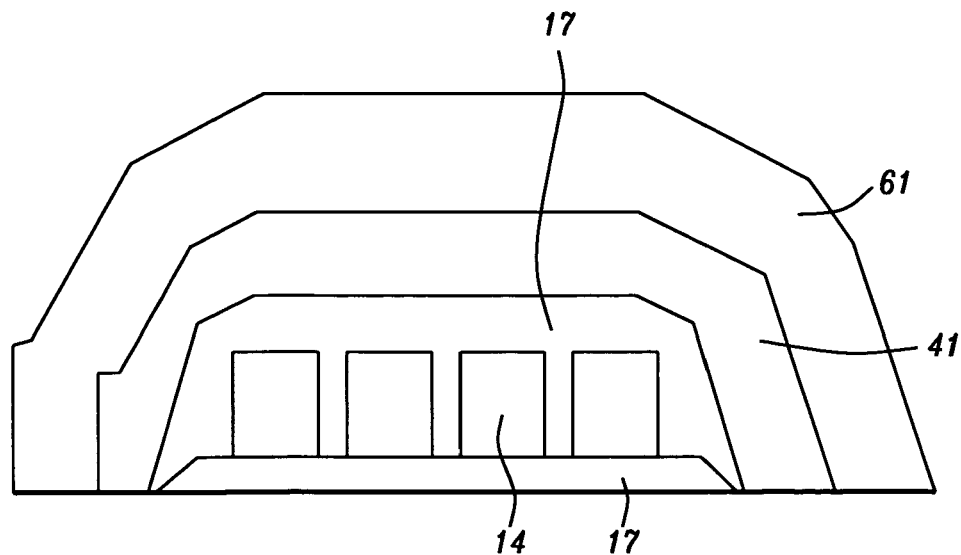
FIG. 6 shows how a layer of non-magnetic material is electro-deposited within the mold of FIG. 5.

In the next step, illustrated in FIG. 4, upper magnetic pole 41 is laid down inside mold 32 by means of electroplating. Then, in a key step illustrated in FIG. 5, mask 32 is exposed through a second mask and a second development is performed. The result is the transformation of mold 32 into mold 52. The latter has a larger internal width than mold 32 so additional amount 53 of the top surface of 31 gets uncovered, typically by between about 1 and 2 microns.

As a key feature of the invention, this is followed by the deposition, through electroplating, of layer of non-magnetic material 61 on upper magnetic pole 41 as well as the exposed areas 53. Our preferred materials for electroplated layer 61 have been any of NiPd, NiP, or NiCu, but any non-magnetic electro-platable material could have been used.

The process concludes with the removal of mold 52 followed by simultaneously polishing both magnetic poles until the ABS level is reached, making sure that some thickness of non-magnetic material 61 remains. Except for the presence of layer 61, The final structure is as seen in FIG. 1 except that element 18 is now (non-magnetic) metal rather than alumina. Because it was deposited through electroplating, the replacement for element 18 has good step coverage and polishing may be terminated arbitrarily close to upper pole 15 without stressing it. Typically the thickness (in a direction normal to the ABS) of the non-magnetic material that is left after pole trimming is between about 0.3 and 0.9 microns.

2$^{nd}$ Embodiment (Planar Writer)

Figure 7:
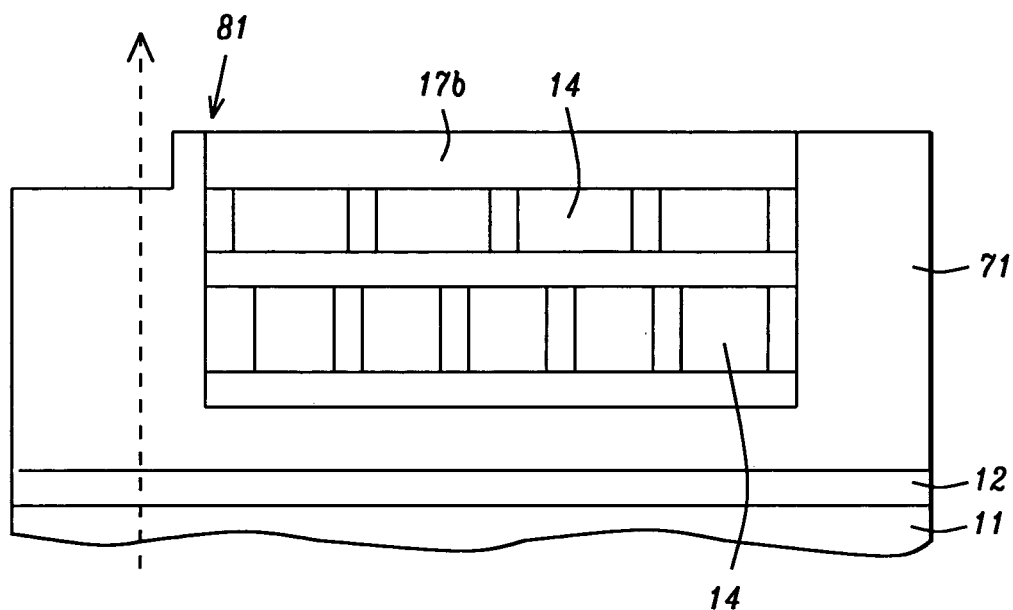
FIG. 7 shows the lower pole and coil well of a planar writer.
Figure 8:
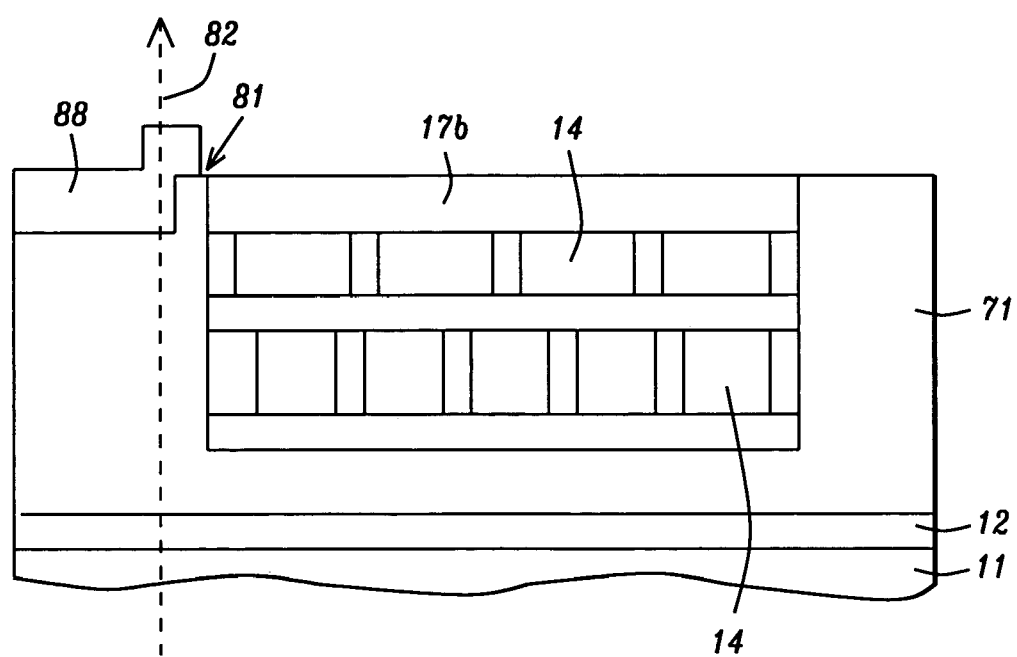
FIG. 8 shows how a layer of non-magnetic material is electro-deposited over the step that is part of the lower pole's upper surface.

Referring now to FIG. 7, the process begins with the provision of lower magnetic pole 71 (for purposes of simplification, elements 13, 24, 25, and 26 are shown as single element 71) in which we form a cavity (extending downwards from the top surface for between about 2.5 and 35 microns) which contains write coils 14. The latter are coated with layer of insulation 17b so that the cavity that contains the coils is just filled. Also shown in FIG. 7 is a step just to the left of cavity edge 81. The distance between the top and bottom surfaces of this step is typically between about 1.5 and 2.5 microns.

A photoresist mold (not shown) is then formed which covers all surfaces except an area that extends from edge 81 of the cavity to a distance that is sufficient to leave fully exposed the step described immediately above (which can be seen to be covered by element 28 in FIG. 2).

Then, through electroplating, layer of non-magnetic material 88 is deposited to a thickness sufficient to cover all of the above-described step (just behind where the ABS, marked by broken line 82, will eventually be), generally to a thickness between about 1.5 and 2.5 microns. Our preferred materials for electroplated layer 88 have been any of NiPd, NiP, or NiCu, but any non-magnetic electro-platable material could have been used. The mold used to contain the electroplate is then removed and the surface is planarized (using CMP) until layers 88, 71, and 17b all have coplanar top surfaces.

Figure 9:
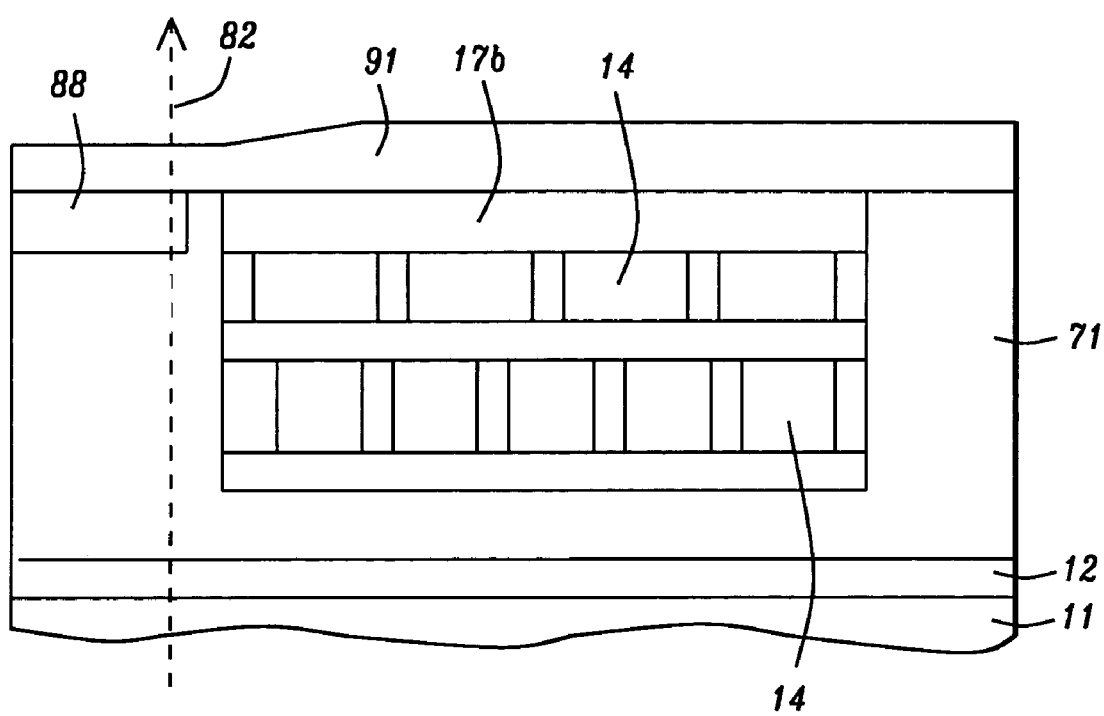
FIG. 9 shows the structure of FIG. 8 after planarization and formation of the upper pole.

Finally, as seen in FIG. 9, upper magnetic pole 91 is formed on the planarized surface and the upper and lower magnetic poles, 91 and 71, as well as layer of non-magnetic material 88, are simultaneously polished the plane marked by arrow 82 is reached so that a small thickness of layer 88 remains, thereby forming the air bearing surface without stressing either of the magnetic poles.

The final structure is as seen in FIG. 2 except that element 28 is now (non-magnetic) metal rather than alumina. Because it was deposited through electroplating, the replacement for element 28 has good step coverage and polishing may be terminated arbitrarily close to pole 26 without stressing it. Typically the thickness (in a direction normal to the ABS) of the non-magnetic material that is left after pole trimming is between about 0.3 and 0.5 microns.

What is claimed is:

1. A method to protect a magnetic write head during pole trimming, comprising:

providing upper and lower magnetic poles that surround a write coil, one of said poles being recessed relative to the other whereby there is a step between them;

electroplating a layer of non-magnetic material to fully cover said step; and then simultaneously polishing both poles as well as said layer of non-magnetic material until an amount of said layer of non-magnetic material remains, thereby forming an air bearing surface without stressing either of said magnetic poles.

2. The method described in claim 1 wherein said electroplated layer of non-magnetic material is selected from the group consisting of NiPd, NiP, and NiCu.

3. The method described in claim 1 wherein said remaining amount of electroplated non-magnetic material has a thickness, in a direction normal to said air bearing surface, of between about 0.3 and 0.5 microns.

4. The method described in claim 1 wherein said layer of electroplated non-magnetic material is deposited to a thickness between about 1.5 and 2.5 microns.

5. A process to form an air bearing surface for a LDCR magnetic write head, comprising:

providing a lower magnetic pole, having a top surface, and forming therein a cavity containing a write coil that projects above said cavity;

coating said coil with a layer of insulation and a seed layer and thereby filling said cavity;

coating said seed layer and said lower pole top surface with a layer of a positive photoresist;

by exposing through a first mask and then performing a first development, forming from said layer of photoresist a first mold that surrounds the coil while leaving part of said top surface exposed;

through electroplating, depositing an upper magnetic pole on said seed layer and on the exposed top surface;

by exposing through a second mask and then performing a second development, forming a second mold from said first mold, thereby exposing an additional amount of said top surface;

through electroplating, depositing a layer of non-magnetic material on said upper magnetic pole and on said additional exposed top surface;

then removing the second mold; and then simultaneously polishing said lower magnetic pole and said layer of non-magnetic material until a thickness of said layer of non-magnetic material remains, thereby forming said air bearing surface without stressing either of said magnetic poles.

6. The process recited in claim 5 wherein said write coil projects above said cavity by between about 3 and 5 microns.

7. The process recited in claim 5 wherein the part of said top surface that is exposed inside said first mold is between about 2 and 4 microns.

8. The process recited in claim 5 wherein the part of said additional amount of the top surface that is exposed inside said second mold is between about 1 and 2 microns.

9. The process recited in claim 5 wherein said electroplated layer of non-magnetic material is selected from the group consisting of NiPd, NiP, and NiCu.

10. The process recited in claim 5 wherein said remaining thickness of electroplated non-magnetic material, in a direction normal to said air bearing surface, is between about 0.3 and 0.9 microns.

11. The process recited in claim 5 wherein said layer of electroplated non-magnetic material is deposited to a thickness between about 2 and 3 microns.

* * * * *